April 21, 1959     J. PARSTORFER     2,882,748
CONNECTING LINK FOR VIBRATING BODIES
Filed June 23, 1955     3 Sheets-Sheet 1
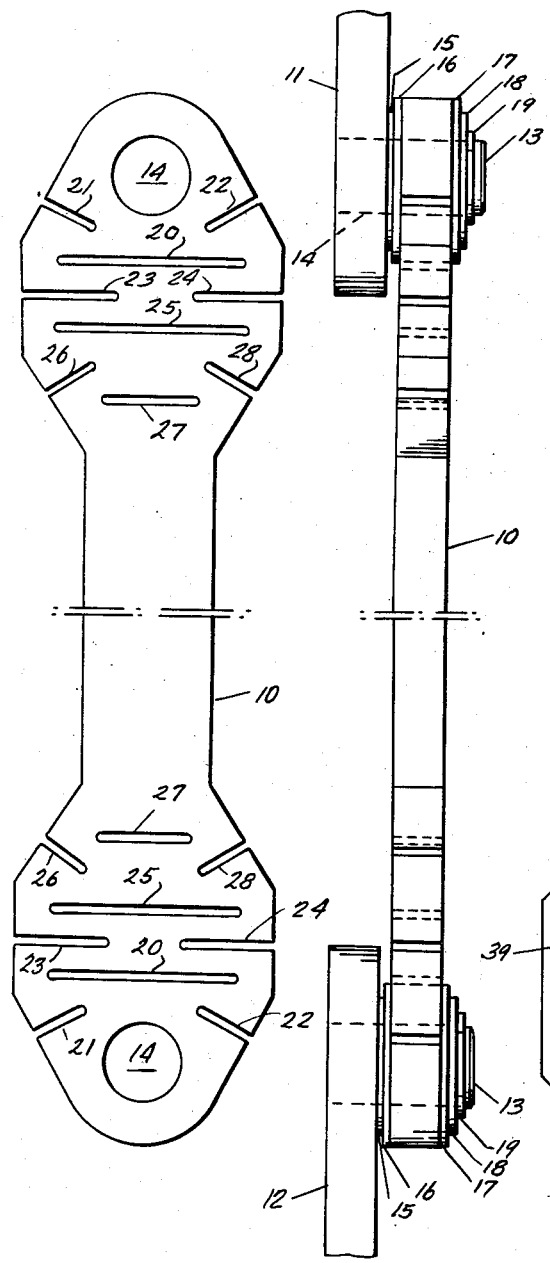
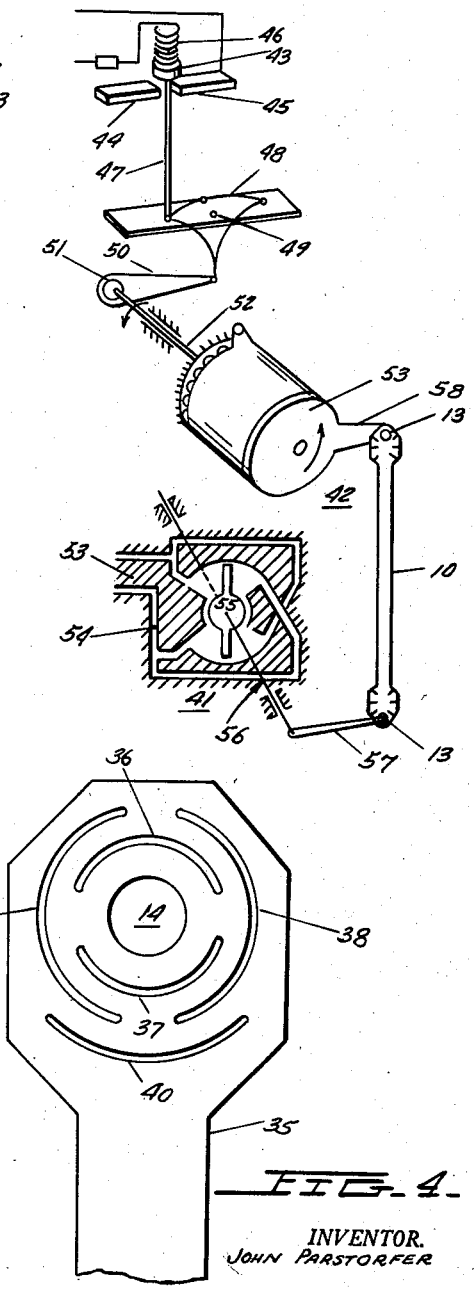
INVENTOR.
JOHN PARSTORFER April 21, 1959  J. PARSTORFER  2,882,748
CONNECTING LINK FOR VIBRATING BODIES
Filed June 23, 1955  3 Sheets-Sheet 2

INVENTOR.
JOHN PARSTORFER
BY Ostrolenk, Faber,
Gerb & Soffen
ATTORNEYS

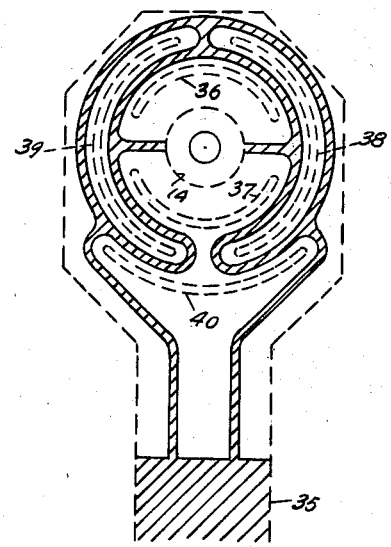
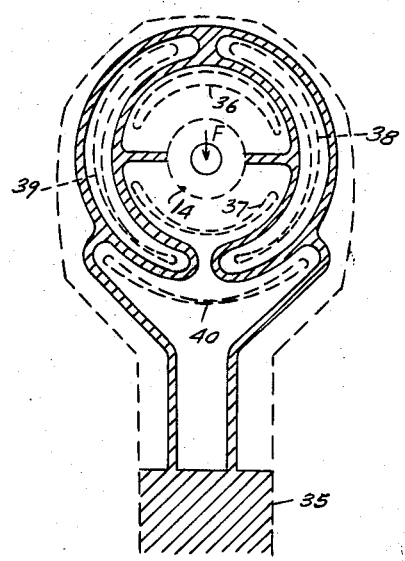
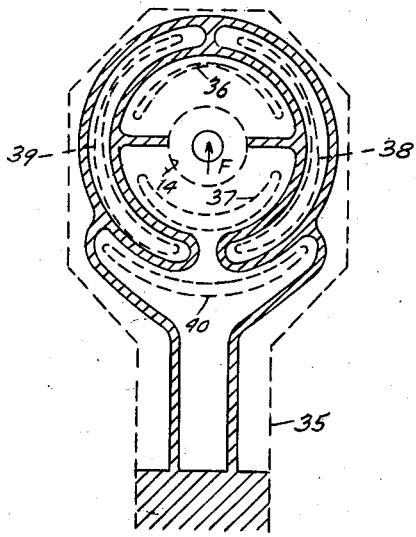
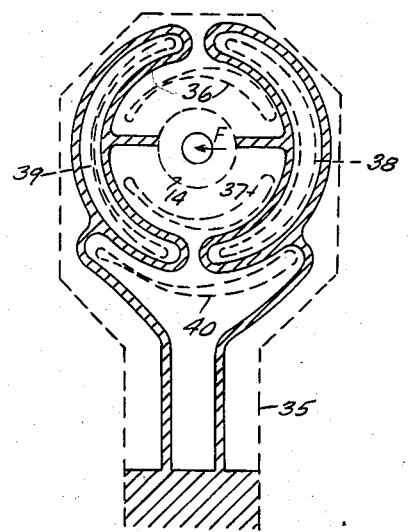

United States Patent Office 2,882,748
Patented Apr. 21, 1959

2,882,748

CONNECTING LINK FOR VIBRATING BODIES

John Parstorfer, Philadelphia, Pa., assignor to I-T-E Circuit Breaker Company, Philadelphia, Pa., a corporation of Pennsylvania Application June 23, 1955, Serial No. 517,565

4 Claims. (Cl. 74—581)

My invention relates to a connecting link for connecting bodies which are in vibratory motion with respect to one another.

Many well known applications require the fastening between a first and a second body which are vibrating with respect to one another, wherein the two vibrating bodies could be part of a structural element where one body could be absolutely rigid and the second body is in vibration with respect to the above mentioned first rigid body.

Another example of this problem occurs in connecting the overlap regulator, which is a hydraulic regulator, to the synchronous motor of a mechanical rectifier. This structure is set forth in co-pending application, Serial No. 494,496, filed March 15, 1955.

Specifically, the overlap regulator and synchronous motor of the rectifier are fastened in such a manner that the overlap regulator which is vibrating at one particular frequency, must be linked to the synchronous motor of the mechanical rectifier which is vibrating at still another frequency. The connecting link is provided with a shaft or axle at either end, and this shaft or axle at either end is then connected to the driving arm of the overlap regulator and the stator of the synchronous motor respectively.

However, because of the high stresses which are presented by the vibrations of these two connecting bodies, both of which have high inertia, the link after relatively short periods of operation is either broken or the axle saws an elongated hole in the link, or the axle is actually sawed away.

Although the problem of connecting a first and second body which are in relative motion to one another and its consequences are described above with reference to a specific linkage with respect to mechanical rectifier, it is obvious that the above description can be extended to cover the connection between any two bodies having relative motion to one another in any environment.

The principle of my invention is to provide at least one slot in the connecting link which is positioned between the points on the link which will connect to the vibrating bodies and is substantially perpendicular to the axis of the link. This will then allow the link material to flex to thereby extend or compress the slot depending upon the direction of the relative motion to thereby absorb the energy of the motion. Therefore, the energy of the vibration is taken up in flexing the link rather than allowing a sawing condition between the link and its connecting point. The physical strength of the link is impaired only by a small amount, since the dimensions of the slot can be small. Clearly, this slot can be of any shape such as an elongated slot, hole, or any such desired configuration.

In a practical case, my principle assumes the form of providing a plurality of slots in the neighborhood of the fastening point between the link and one of the vibrating bodies in such a manner as to have the material defined by these slots to assume a spring type shape. This therefore provides a link of extremely high flexibility as compared to the original solid link fastening the two bodies and still maintains a major portion of the link strength. The spring like nature which is imparted to a link when applying the principle of my novel invention, can be easily imparted to a connecting link since it is only required that simple slots be cut in the link material. This can be done by any desirable tool, such as a jig saw, and the slots can be made to conform only to a low order of precision.

In view of the spring analogy, it is obvious that the link will be flexible in any direction, and will afford a bellows type of flexibility to absorb the energy of vibrations which are perpendicular or on a skew angle to the length of the slots. Although the link may be of any desired material, extremely good results are obtained when the link is manufactured of textile laminations such as Bakelite. The physical dimensions of the link will vary, depending upon the inertia of parts to be fastened and vibrations involved.

It is to be realized that the link of my invention is not necessarily limited to applications where a first and second body are rigidly attached but can also be used in an application where at least one end of the link is operative by or removably connected to a body, this connection being as an example, a ball and socket arrangement.

Accordingly, a primary object of my invention is to provide a link for connecting bodies which are vibrating with respect to one another.

Another object of my invention is to provide link for connecting bodies having relative motion between one another wherein the link is given predetermined spring type characteristics by providing slots of a predetermined shape about the portion at which the link is joined to the vibrating body.

Still another object of my invention is to provide a connecting link for vibrating bodies wherein the link has slots placed in the vicinity of the connecting point, such that the energy of motion of the body is absorbed in flexing the link material between the slot of the connecting point.

Another object of my invention is to provide a link for connecting bodies in relative random motion to one another, which is simple to manufacture and absorbs the energy of vibration without transmitting high forces to the junction of either body and link.

Still another object of my invention is to provide means within a connecting link in such a manner as to impart an equivalent spring characteristic to the link.

These and other objects of my invention will become apparent when taken in conjunction with the drawings in which:

Figure 1 shows a portion of a connecting link constructed in accordance with my invention.

Figure 2 shows the cross sectional side view of the link shown in Figure 1 as being fastened to a vibrating body.

Figure 4 shows a second embodiment of my invention.

Figure 5 shows the equivalent spring diagram of the connecting link of Figure 4.

Figure 5a is similar to Figure 5 when the connecting link is in a compression state.

Figure 5b is similar to Figure 5 when the connecting link is in a tension or extended state.

Figure 5c shows the link of Figure 5 when stressed by forces perpendicular to the axis of the link.

Figure 6 shows the application of the link of Figure 1 as the connecting means between the hydraulic regulator and synchronous motor stator of the mechanical rectifier.

Figure 3:
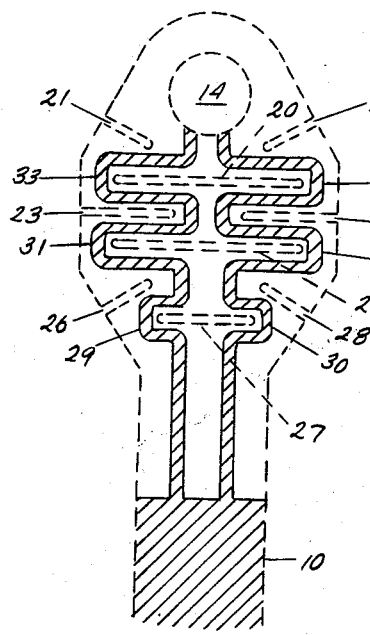
Figure 3 shows the link of Figure 1 as being replaced by its equivalent spring.

Referring now to Figure 1, the connecting link 10 is a link which can be used to connect a first vibrating body to a rigid body, or more generally, to connect a first and second body which are vibrating with respect to one another.

In the embodiment of Figures 1 and 2, my novel connecting link 10 forms a high strength connection between a first vibrating body 11 and a second body 12. Bodies 11 and 12 are connected to the link 10 by means of axles 13, which can be maintained within the holes 14 of connecting link 10 by means of the connection specifically shown in Figure 2. That is, the axle 13 can be threadably engaged within the bodies 11 and 12, and a brass washer 15 and rubber washer 16 can be inserted between the bodies 11 and 12 of the link 10, the link 10 then being maintained against the washers 15 and 16 by means of a rubber washer 17, brass washer 18 and a retaining nut 19. This type of connection however, is merely illustrative of the many ways by which the link 10 can be fastened between the bodies 11 and 12. A plurality of slots, shown in Figure 1 as slots 20, 21, 22, 23, 24, 25, 26, 27 and 28, are then positioned between the point of connection between the link 10 of the vibrating bodies 11 or 12 in accordance with the principle of my invention.

Although a plurality of slots have been shown in the embodiment of Figure 1, it will become apparent that only a single slot such as slot 20 need be provided. As mentioned heretofore, the provision of these slots 20–28 will impart a spring type characteristic to link 10 of Figures 1 and 2. This spring type characteristic is more clearly understood when referring to Figure 3.

In Figure 3 the link 10 of Figure 1 is drawn in dotted lines and the portion of the link which maintains the connection between the vibrating bodies 11 and 12 of Figure 2 is shown diagrammatically as a series of cross sectional areas. It is therefore clear that the material of link 10, which is defined by slots 26 and 27 or 27 and 28, defines a first spring convolution 29 and 30 respectively. Similarly another spring convolution 31 and 32 will be defined by slots 25 and 23 or 25 and 24 respectively. A third spring convolution indicated generally as 33 and 34 will be imparted to the link 10 in view of the slots 20 and 21 or 20 and 22 respectively.

Figure 3A:
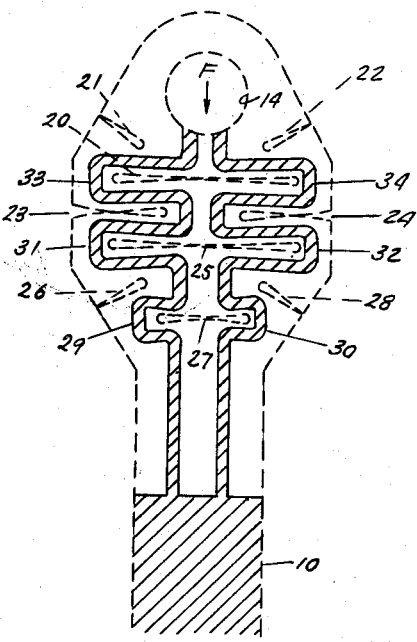
Figure 3a is similar to Figure 3 when the link is in a compression state.

The operation of the link 10 of Figure 1 when considered as comprising the equivalent spring diagram of Figure 3 is shown in Figure 3a when the link 10 is under compressional force. That is, a force indicated as "F" is imparted in a downward direction upon the axle 13 with respect to the other end of the link. As clearly shown in Figure 3a the inertia due to the compressional force is absorbed by the compression of slots 20, 25 and 27 and the extension of slots 21, 22, 23, 24, 26 and 28 and the equivalent spring shown in the cross sectional area clearly indicates the spring type action in the compressional distortion of the equivalent spring of Figure 3a.

Figure 3B:
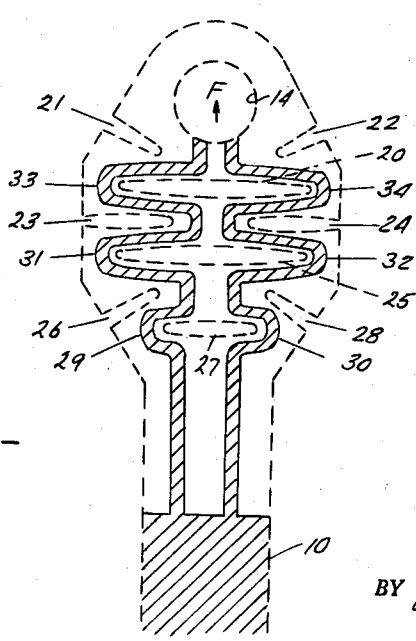
Figure 3b is similar to Figure 3 when the link is in a tension or extended state.

Figure 3b similarly shows the equivalent diagram of Figure 3 when an upward force is imparted to axle 13, or more specifically when the link 10 is under tension due to the relative motion of bodies 11 and 12. An analysis of Figure 3b clearly shows that the energy of the tension forces is dissipated in extending the slots 20, 25 and 27 and compressing the slots 21, 22, 23, 24, 26 and 28 and the equivalent spring shown in the cross sectional area is extended accordingly.

Clearly, consideration of both Figures 3a and 3b shows that the energy of both tension and compression are absorbed in flexing the link 10 which now has a spring type character to thereby prevent binding or sawing forces between the axle 13 and the link 10 from elongating a hole in the link or wearing away the axle 13.

Since the link 10 is further shown in Figures 1 and 2 as being rotatably mounted upon axles 13 with respect to the bodies 11 and 12, a relative motion between these bodies which is in a plane parallel to the plane of the slots will clearly be taken up by rotation of the link 10 about axle 13 without imparting shearing stress to the link 10.

A second embodiment of my novel invention is shown in conjunction with Figure 4, where similarly to the embodiment of Figures 1 and 2, the hole 14 of link 35 is maintained by a means such as an axle to a rigid body. For the purpose of simplicity, only the upper end of the link 35 of Figure 4 is shown. It is clear that the lower end of the link 35 could be either rigidly mounted to a body as could be the link of Figures 1 and 2, or the lower portion could have the same structure as the upper portion. The upper portion of link 35 of Figure 4 comprises a series of slots 36, 37, 38, 39 and 40, which are concentric to the point of fastening or hole 14 between the link 35 and the rigid body which could be the rigid body 11 or 12 of Figures 1 and 2. The spring equivalent of the connecting link of Figure 4 is clearly shown in the drawing of Figure 5, and its operation can be analyzed in a similar manner as was the operation of the link shown in Figures 1 and 2.

In the link in Figure 5, flexibility is provided for conditions of both compression of the link 35 and extension of the link 35 as was provided with the link of Figures 1 and 2 and provides, in addition, flexibility in a direction perpendicular to the axis of the link 35. This would be a desirable feature in the event that the lower point of fastening of the link in Figure 4 is rigid and vibrational energy which is transmitted perpendicular to the axis of the link cannot be absorbed by a simple rotation of the link.

Figure 5a specifically shows the distortion of the link slots as well as the equivalent spring in the case of compressional forces, and Figure 5b similarly shows conditions under extension forces.

Figure 5c then indicates the flexing of the equivalent spring and slots to the right, in the case of the link being rigidly fastened at its lower end and the relative motion of the bodies being fastened by the link 35 is directed towards the right.

Figure 6 specifically shows one particular application of my novel connecting link when taken in conjunction with the connection between a hydraulic regulator and the synchronous motor of a mechanical rectifier. Although the connecting link could have been either of the links shown in Figure 1 or Figure 4, or any modification thereof, the link of Figure 1 has been arbitrarily selected to be used as the connecting means. A detailed description of the operation of the hydraulic regulator indicated generally at 41 and of the synchronous motor indicated generally as 42 may be found in co-pending application, Serial No. 494,496.

In general, however, a contact 43 is being driven into and out of engagement with a pair of stationary contacts 44 and 45 against a biasing spring 46 by means of a push rod 47. The required oscillating motion is imparted to the push rod 47 by means of a rocker arm 48 which is pivotally mounted on a pivotal axis 49 and driven by a link 50 which is in turn driven by an eccentric 51 of the motor shaft 52. As further described in application, Serial No. 494,496, the motor shaft 52 of synchronous motor 42 is connected to many such push rods 47 for driving contacts assembly into and out of engagement.

In order to obtain voltage regulation of the rectifier, it is necessary to rotate the stator 53 of the motor 42 to a predetermined angle. This angle is determined by a computer type of system which is not shown in Figure 6, which subsequently drives oil through the vents 53 or 54 of the oil regulator 41, to thereby cause rotation to a predetermined position of the vane 55. The vane 55 has an output shaft 56 which drives the output crank arm 57.

It should be noted that the oil regulator shown generally as regulator 41 is a vibrating body in view of the oil pumps required to drive it and many other factors which cause vibration in electric systems. Similarly, the synchronous motor 42 is vibrating in view of the forces transmitted through the push rod 47 when operating the contact 46 and vibration of the motor housing itself.

The problem is now presented of attaching the crank arm 58 of the synchronous motor stator 53 to the output crank arm 57 of the oil regulator 41, which determines the position of the stator angle of synchronous motor 42. Figure 6 clearly shows this connection being performed by link 10 of Figure 1.

In accordance with the operation described for link 10 in conjunction with Figures 3, 3a and 3b, when the vibrations of the motor 42 and regulator 41 are in a direction towards one another, compressional forces will be imparted to link 10 and the energy of these compressional forces will be absorbed as shown in Figure 3a. Similarly, when the relative motion between the motor 42 and the regulator 41 extends link 10, the energy due to the tension in the link 10 will be absorbed as shown in conjunction with 3b.

When the relative motion between regulator 41 and motor 42 is in a direction at an angle to the axis of link 10, there will be a first component which will cause rotation of the link 10 about the points connecting it to the vibratory bodies and a second component which will be either a tension component or compression component will be accounted for in an action similar to that shown in either Figures 3a or 3b.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A link for connecting a first and second body which are movable with respect to one another; a first and second portion of said link being attached to said first and second bodies respectively; said link having a first and second slot positioned on either side of said first portion of said link is fastened to said first body, said first slot being positioned between said first and second bodies respectively, said link being a unitary member, said first slot being compressed and said second slot being extended when the relative motion of said first and second bodies is towards one another, said first slot being extended and said second slot being compressed when the relative motion between said first and second bodies is in a direction away from one another.

2. A link for connecting a first and second body which are movable with respect to one another; a first and second portion of said link being attached to said first and second bodies respectively; said link having a first and second slot positioned on either side of said first portion of said link is fastened to said first body; said first and second slot lying in a direction substantially perpendicular to a line formed by said first and second portions of said link which are attached to said first and second bodies respectively; said link being a unitary member, said first and second slots being distorted when the relative motion of said first and second bodies is perpendicular to the line formed by said first and second portions of said link.

3. A link for connecting a first and second body, said first and second body having relative movement with respect to one another, said link being constructed to have a first and second portion fastenable to said first and second bodies respectively and a plurality of slots, said link being a unitary member, said plurality of slots being positioned to be distorted when said first and second bodies move with respect to one another to thereby dissipate the forces transmitted between said first and second fastenable portions of said link, said plurality of slots defining an equivalent spring for the link material in the vicinity of said slots; at least one of said slots being positioned on an opposite side of said first fastenable portion with respect to other slots of said plurality of slots.

4. A link for connecting a first and second body which are movable with respect to one another; a first and second portion of said link being attached to said first and second bodies respectively; said link having a first and second slot positioned on either side of said first portion of said link fastened to said first body, said link being a unitary member, said first and second slots being distorted when the relative motion of said first and second bodies is parallel to the line formed by said first and second portions of said link.

References Cited in the file of this patent

UNITED STATES PATENTS

| | | |
|---|---|---|
| 7,357 | Bissell | May 14, 1850 |
| 255,751 | Zeigler | Mar. 28, 1882 |
| 347,848 | Walter | Aug. 24, 1886 |
| 1,646,302 | McKale | Oct. 18, 1927 |
| 1,797,061 | Gunn | Mar. 17, 1931 |
| 1,848,317 | Church | Mar. 8, 1932 |
| 2,171,185 | Maier | Aug. 29, 1939 |
| 2,706,491 | Kohler | Apr. 19, 1955 |

FOREIGN PATENTS

| | | |
|---|---|---|
| 464,724 | Great Britain | Apr. 23, 1937 |
| 837,318 | France | Nov. 12, 1938 |